A. LYSIAK.
SQUARE HOLE CUTTER.
APPLICATION FILED JULY 11, 1921.

1,402,510.

Patented Jan. 3, 1922.
2 SHEETS—SHEET 1.

Inventor
A. Lysiak
By F. H. Bryant
Attorney

A. LYSIAK.
SQUARE HOLE CUTTER.
APPLICATION FILED JULY 11, 1921.
1,402,510.
Patented Jan. 3, 1922.
2 SHEETS—SHEET 2.
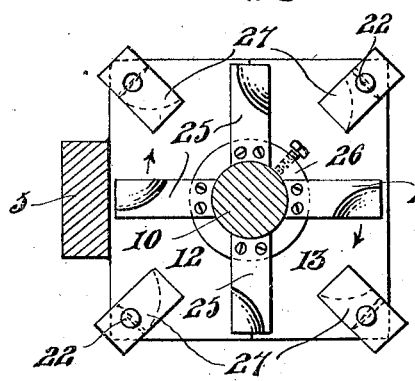
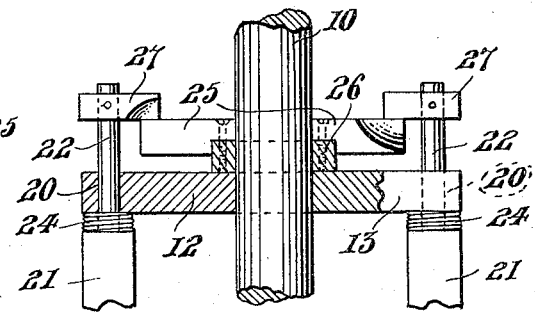
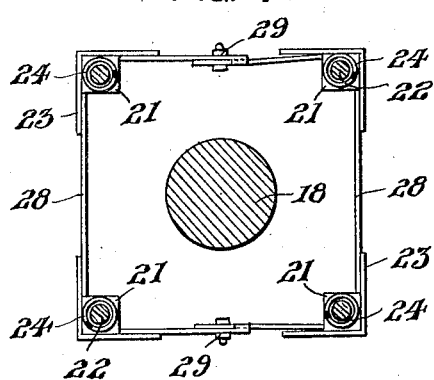
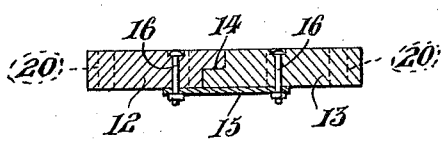
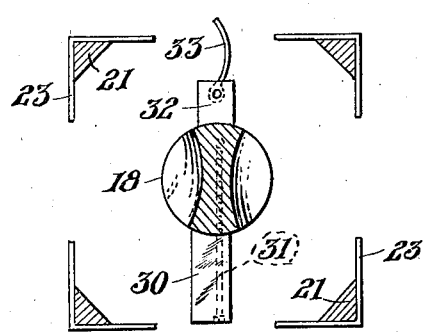
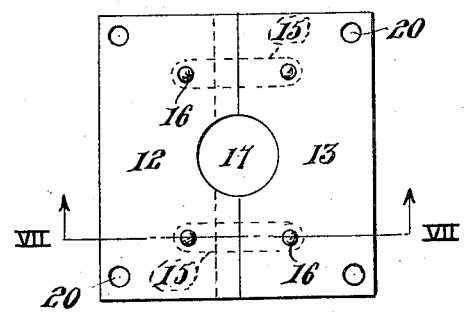

UNITED STATES PATENT OFFICE.

ANTONI LYSIAK, OF MANCHESTER, MASSACHUSETTS.

SQUARE-HOLE CUTTER.

1,402,510.　　　　　Specification of Letters Patent.　　Patented Jan. 3, 1922.

Application filed July 11, 1921. Serial No. 483,783.

*To all whom it may concern:*

Be it known that I, ANTONI LYSIAK, a citizen of Poland, residing at Manchester, in the county of Essex and State of Massachusetts, have invented certain new and useful Improvements in Square-Hole Cutters, of which the following is a specification.

This invention relates to certain new and useful improvements in square hole cutters and has particular reference to the provision of improved means for forming square holes.

In various bodies such as in pieces of work to be joined by special forms of bolts as set forth in my copending application Serial Number 483,784 filed July 11, 1921, upon joint or connection.

The primary object of the invention is to provide a device embodying simplicity and durability of construction for readily and easily forming square or other angular holes.

Another object of the invention is to provide manually operable means for drilling a circular hole, and means operatively connected with said drilling means for cutting away portions surrounding the circular hole so as to form an angular hole for the reception of angular bolts or the like in joints or connections between pieces of work or structural elements.

A still further object of the invention is to provide means operatively connected to a rotary drill including reciprocable cutters adapted to enlarge the circular hole formed by the drill in such manner as to produce an angular hole in pieces to be joined.

A still further object of the invention is to provide a device of the above kind in which the reciprocable cutters are mounted in a separable guide and detachably connected in proper relation so that the same may be disassembled for permitting ready renewal of drills from time to time should the same become broken or otherwise damaged.

With the above general objects in view and others that will become apparent as the nature of the invention is better understood, the invention consists in the novel form, combination and arrangement of parts hereinafter more fully described and shown in the accompanying drawings in which like reference characters indicate corresponding parts throughout the several views.

In the drawings,—

Figure 3 is a horizontal sectional view taken upon line III—III of Figure 1.

Figure 4 is a view similar to Figure 3 taken upon line IV—IV of Figure 1,

Figure 5 is a view similar to Figure 4 taken upon line V—V of Figure 2,

Figure 6 is a fragmentary view partly in elevation and partly in vertical section showing the actuating means for the reciprocating cutters, Figure 7 is a transverse sectional view taken upon line VII—VII of Figure 8, and Figure 8 is a plan view of the cutter guide.

Figure 1:
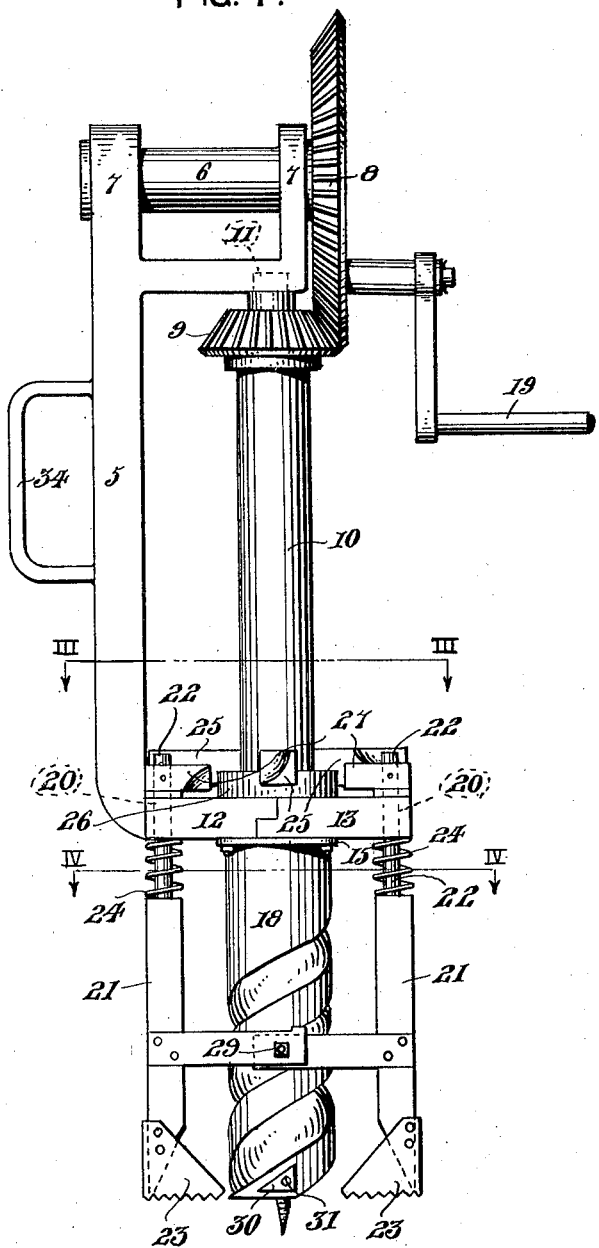
Figure 1 is a side elevational view of a square hole cutter constructed in accordance with the present invention.

Referring more in detail to the several views the invention embodies a frame 5 having a horizontal shaft 6 journaled in the upper end thereof in spaced bearings 7 with one end of said shaft having a large beveled gear 8 secured thereon and meshing with a smaller beveled gear 9 fixed upon a vertical shaft 10 having its upper end journaled as at 11 in the frame 5. The lower end of the frame 5 is attached in any suitable manner to a horizontal guide plate formed in half sections 12 and 13 which may have their adjacent edges rabbeted and overlapped as shown at 14 in Figure 7, the two sections being secured together by means of plates 15 and bolts 16 which pass through the guide plate sections and through said plates 15, the guide plate being provided with a central circular opening as at 17 between the connecting plates 15 through which the shaft 10 rotatably extends.

A spiral drill 18 is secured in any desired manner upon the lower end of the shaft 10 so as to be detachable from the same and a suitable crank handle 19 is provided upon the large bevel gear 8 so that the drill may be rotated manually in the desired direction through the gearing described. The guide plate composed of the sections 12 and 13 is provided with circular openings 20 in each of the four corners thereof and vertically movable stems 21 have their upper ends reduced as at 22 and slidably mounted through said openings 20, the stems 21 having right angular cutters 23 suitably secured upon their lower ends in proximity to the lower end of the drill or auger 18, the stems 21 being normally yieldingly forced downwardly by means of springs 24 and intermittently elevated by means of a plurality of cam arms 25 fixed to and radially projecting from a collar 26 engaging the cam surfaces of corresponding cam arms 27 fixed upon the upper ends 22 of the stems 21 above the guide plate composed of the sections 12 and 13. It will be seen that when the cam arms 25 simultaneously ride under the four cam arms 27, the four stems 21 will be simultaneously elevated against the action of the springs 24 and when the arms 25 pass the arms 27, the springs 24 will forcibly project the stems 21 downwardly and cause the knives or cutters 23 to cut away the material about the opening formed by the auger 18 so as to produce a square opening in the work.

In order to brace the stems 21 against lateral strains so that the same will operate efficiently and cause the cutters 23 to be directed properly into the work, said stems are connected in series by a rectangular frame formed in half sections 28 of sheet metal strips with their opposite end portions overlapped and bolted together as at 29 so that the frame sections 28 and the guide plate sections 12 and 13 may be separated for permitting ready access to the auger 18 for renewal of the latter whenever desired.

Figure 2:
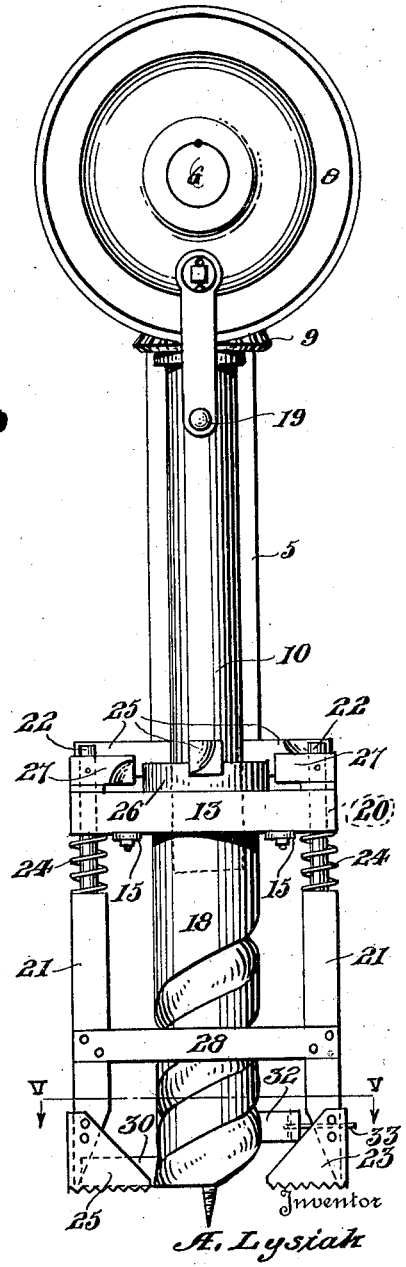
Figure 2 is a front elevational view thereof.

In order to provide for the cutting away of the material between the knives 23 and the auger 18, said auger is provided with a radial projecting cutter 30 which may be fixed to the lower end thereof by means of a screw 31 or the like and which is preferably provided with a beveled upper surface as clearly shown in Figure 1 for efficiently cutting the material and elevating the same from the hole being formed. In order to assist in clearing the hole which is being formed, the auger 18 is provided with a radial arm 32 opposite to the cutter arm 30 with a pivoted finger 33 thereon arranged to eject the material as the same is cut and elevated by the cutter arm 30, said finger 33 being positioned slightly above the cutter arm 30 for this purpose as clearly shown in Figure 2.

In operation, rotation is imparted to the gear 8 by manipulation of the crank handle 19, thus causing rotation of shaft 10 through the bevel gear 9 and accordingly rotating the auger 18 and the cam arms 25. The rotation of the auger in the proper direction causes the same to be fed into the work for forming a circular hole therein and upon each quarter revolution of the shaft 10, the arms 25 engage the cam arms 27 so as to elevate the cutters 23 against the action of the springs 24 and then permit the springs 24 to forcibly project the cutter 23 downwardly so as to define a square hole with which the auger 18 is concentric and so that the cutter arm 30 may effectively remove portions of the work between the cutters 23 and the auger 18 in cooperation with the finger 33, which finger and cutter arm rotate with the auger by being fixed thereto. In manipulating the present tool, a handle 34 is provided upon the frame 5 so that the device may be grasped in one hand for steadying while the crank handle 19 is being rotated with the other handle.

From the foregoing description, it is believed that the construction and operation as well as the advantages of the present invention will be readily understood and appreciated by those skilled in the art. Minor changes may be made without departing from the spirit and scope of the invention as claimed.

What is claimed as new is:

A square hole cutter comprising a frame having a horizontal guide plate at the lower end thereof provided with corner guide openings and a central opening, a vertical shaft journaled in said central opening and having its upper end journaled in the upper end of the frame, means to apply rotary motion to the upper end of said shaft, cutter stems slidable through the corner openings of the guide plates and having right angular cutters upon the lower ends thereof, means above said guide plate operatively connecting said stems to said shaft whereby the stems are reciprocated upon rotation of the shaft, an auger concentric with said stems fixed upon the lower end of said shaft, a radial cutter arm for removing material about the auger between the latter and the cutter knives rigidly fixed to the lower end portion of said auger, means operating with said auger to eject the material removed by said radial cutter arm, said radial cutter arm being provided with a beveled upper surface to cause outward movement of the material removed thereby, and said material ejecting means including a finger arranged in a plane above said cutter arm.

In testimony whereof I affix my signature.

ANTONI LYSIAK.